O. W. HENSEL.
POSTHOLE AUGER.
APPLICATION FILED SEPT. 30, 1920.
1,401,780.
Patented Dec. 27, 1921.
3 SHEETS—SHEET 1.
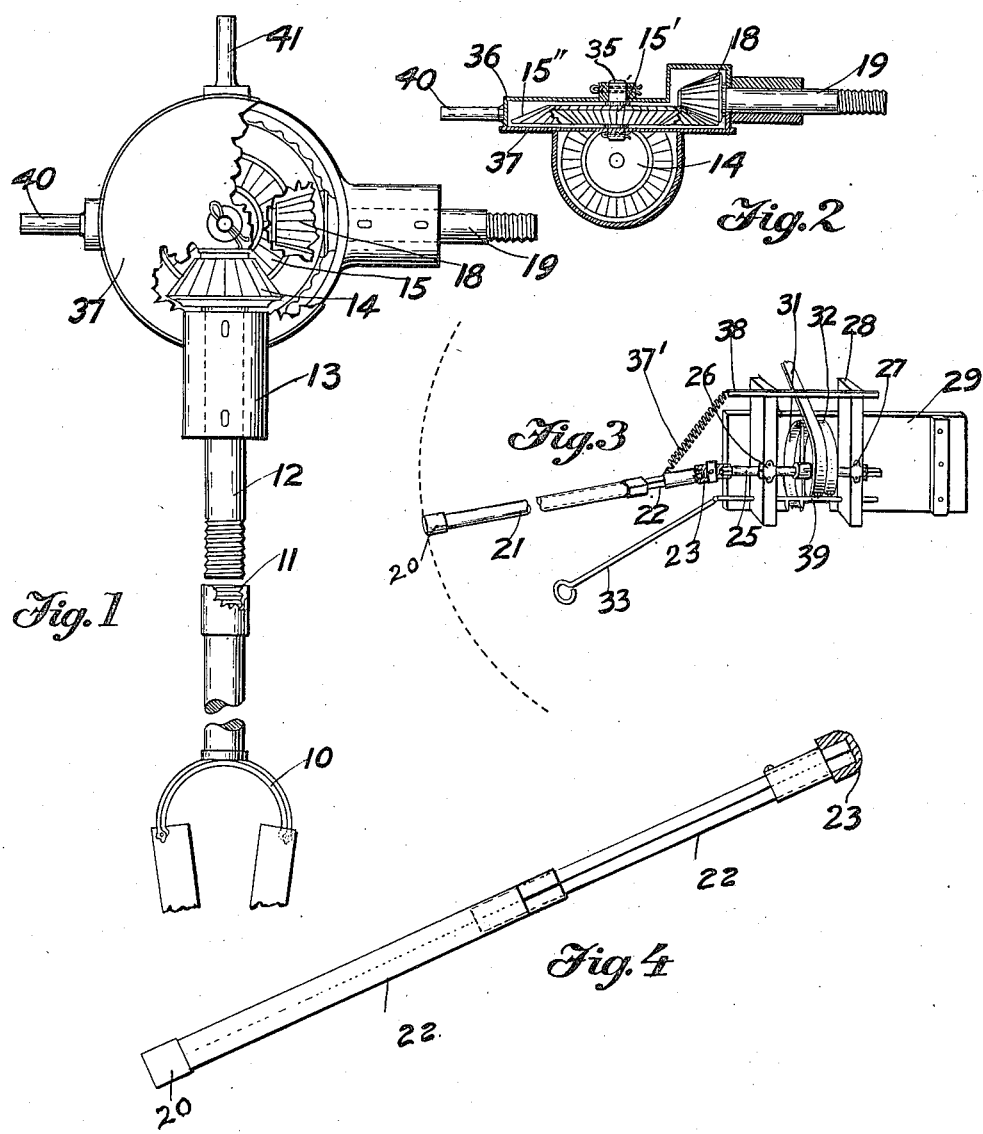
Otto W. Hensel INVENTOR.
BY
ATTORNEY.

O. W. HENSEL.
POSTHOLE AUGER.
APPLICATION FILED SEPT. 30, 1920.

1,401,780.

Patented Dec. 27, 1921.
3 SHEETS—SHEET 2.

Otto W. Hensel   INVENTOR.

BY

ATTORNEY.

O. W. HENSEL.
POSTHOLE AUGER.
APPLICATION FILED SEPT. 30, 1920.
1,401,780.
Patented Dec. 27, 1921.
3 SHEETS—SHEET 3.
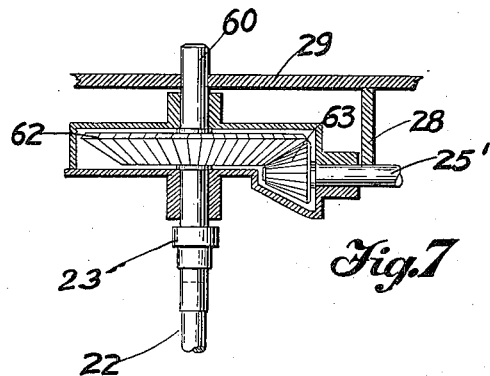
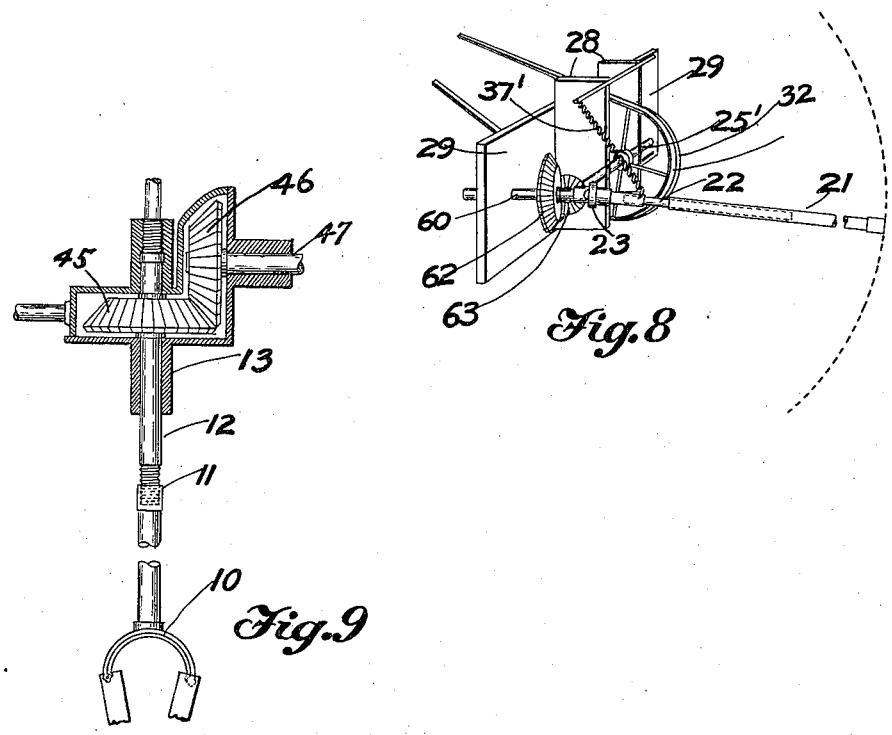
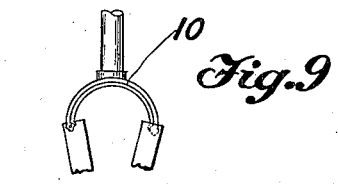
Otto W. Hensel  INVENTOR.
BY
ATTORNEY.

UNITED STATES PATENT OFFICE.

OTTO W. HENSEL, OF LAKEFIELD, MINNESOTA.

POSTHOLE-AUGER.

1,401,780.  Specification of Letters Patent.  Patented Dec. 27, 1921.

Application filed September 30, 1920. Serial No. 413,747.

*To all whom it may concern:*

Be it known that I, OTTO W. HENSEL, a citizen of the United States, residing at Lakefield, in the county of Jackson and State of Minnesota, have invented certain new and useful Improvements in Posthole-Augers; and I do hereby declare the following to be a full, clear, and exact description of the invention, such as will enable others skilled in the art to which it appertains to make and use the same.

This invention relates to a post hole auger, and one of the objects is to provide driving means of particular construction permitting of the free movement of the auger vertically and at an angle with the vertical, so that the greatest possible flexibility of movement is provided.

A further object is to provide in connection with a driving shaft mounted on a stationary support, or on an element of a vehicle, means for directly guiding the auger and comprising suitable gearing and a shaft connected with the shaft first named and including a plurality of telescoping sections and a universal joint.

A still further object is to provide for the reduction of speed between the primary driving shaft and the gearing for directly imparting movement or rotation to the auger.

A still further object is to provide a casing or housing of certain novel construction for inclosing the gearing by means of which rotation is imparted to the auger.

A still further object is to provide, in one form of the device, an auger shaft mounting a gear wheel rotatable in an approximately horizontal plane and driven by a beveled pinion on a horizontal shaft to which movement is imparted by a flexible connection with the primary driving mechanism.

With the foregoing and other objects in view, the invention consists in the novel construction, combination, and arrangement of elements hereinafter described and claimed.

In the accompanying drawings:

Figure 1 is a view of one form of the device in side elevation, parts being broken away.

Fig. 2 is a horizontal section on a plane above the gear wheel mounted directly on the shank or shaft of the auger.

Fig. 3 is a further view of a driving shaft mounted on a suitable support, which may be the end gate of a wagon or truck.

Fig. 4 is a detailed view of the shaft formed in telescoping sections.

Fig. 7 is a detail of construction described below.

Fig. 8 shows a modified form employing a countershaft geared to the main drive shaft.

Fig. 9 shows a drive for the auger shaft, employing two gears of the same size.

Figure 5:
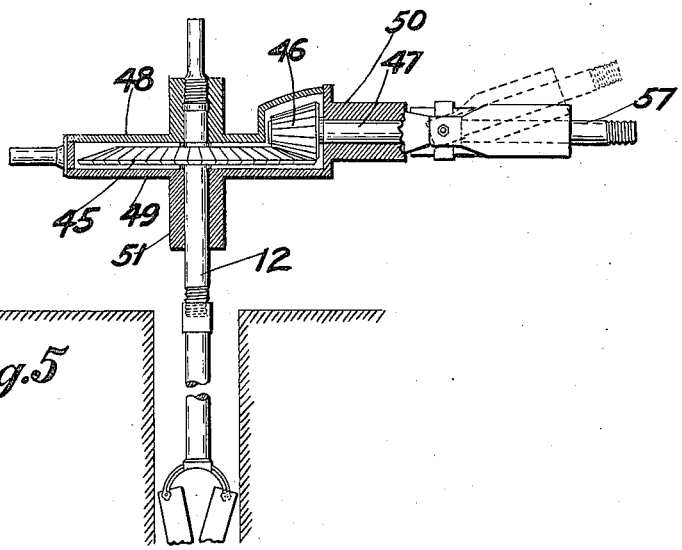
Fig. 5 is a vertical section of a modified form in which only two gears are employed.
Figure 6:
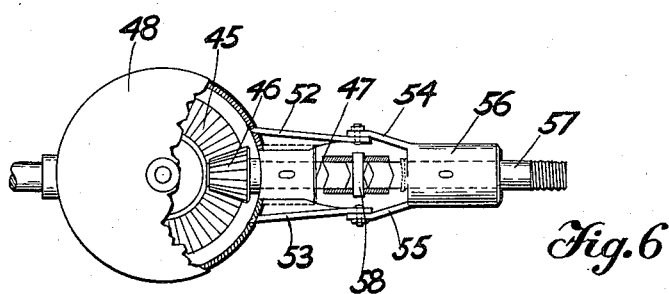
Fig. 6 is a view of the form last mentioned, in top plan, portions being broken away.

The auger 10 of any suitable or preferred construction is detachably connected at 11 with a shaft 12 operating in a bearing sleeve 13 and carrying at its upper end a beveled gear wheel 14 rigidly mounted thereon. This wheel 14 meshes with the inner series of teeth on the gear wheel 15, the outer series of teeth on the opposite side of this gear wheel meshing with beveled pinion 18 on the shaft 19.

The shaft last named is connected by a coupling 20 with the shaft section 21 having telescoping connection with the shaft 22, and the latter is driven through a flexible connection or universal joint 23 from shaft 25.

The shaft 25 is mounted in bearings 26 and 27 preventing end thrust, these being in turn mounted on brackets 28 secured to any suitable support. The brackets may be conveniently mounted on an end gate 29 of a wagon or truck, and the shaft 25 is driven from any suitable source of power through pulley 31. A loose pulley 32 on the shaft 25 and a belt shifting device 33, serve an obvious purpose.

The gear wheel 15 is provided with two series of teeth, as indicated, the inner series being designated 15′ and the outer series 15″. The wheel is mounted on an axle 35 which passes through the elements 36 and 37 of the two part housing or casing. The element 37 of the casing is rotatable with reference to the other casing element, providing a maximum degree of flexibility in the use of the device. One of the elements of the telescoping shaft member is connected by means of a coiled spring 37′ with any suitable device such as a transverse bar 38. Means for controlling the belt shifting device are shown conventionally at 39, any suitable means being employed. In order to manually control the position of the auger during operation I provide handles 40 and 41 located at the points shown and mounted directly on the housing or casing inclosing the driving mechanism.

In the modified form shown in Fig. 5 and elsewhere the shaft 12 by means of which motion is directly imparted to the auger, carries rigidly therewith a beveled gear wheel 45 operating in an approximately horizontal plane and driven by beveled pinion 46 on a shaft member 47. In this form the housing comprises upper and lower elements 48 and 49 rigidly connected.

Formed with the members of the housing are sleeves 50 and 51 accommodating the horizontal and vertical shafts, respectively.

A pair of arms 52 and 53 project from the housing and have pivotal connection with arms 54 and 55 formed on a sleeve 56 receiving the shaft member 57 through which power is transmitted to the gearing and then to the auger. The shaft members 47 and 57 are connected as shown at 58.

The form of the device last described may be connected with the driving shaft 25 of the form first described.

In a still further form of the device, I have shown gears 45 and 46 of equal diameter, the reduction in speed being effected by introducing a counter shaft 60 geared to the shaft 25', the gears for effecting this reduction being designated 62 and 63.

The construction described affords unusual flexibility and freedom of movement in a device of this kind, and in each form the drive is direct and positive, so that the flexibility afforded is a distinct advantage, detracting nothing from the practical use of the apparatus. It is obvious that changes, alterations, or additions may be made within the scope of the appended claims.

Having thus described the invention, what I claim is:

1. A device of the class described comprising a shaft for directly mounting an auger, a gear wheel keyed on said shaft, a double gear wheel having one series of teeth meshing with the gear wheel first named, a third gear wheel meshing with the other series of teeth on the second named gear wheel, a shaft member driven by the third gear wheel, a housing inclosing said gear wheel, a driving shaft mounted on a stationary element, and flexible devices for imparting movement from the shaft last named to the shaft mounting the third gear wheel.

2. A device of the class described comprising a shaft for mounting an auger, gearing for imparting movement to said shaft, a housing for inclosing the gearing, said housing being formed in a plurality of sections one of which is rotatable with reference to the other, a driving shaft, and flexible means for imparting movement from the driving shaft to the aforesaid gearing.

3. A device of the class described comprising a shaft for driving an auger, gearing for imparting movement to the shaft, said gearing including a double gear wheel of the beveled type including an outer series of teeth and an inner series of teeth, and means for imparting movement to the aforesaid gearing.

In testimony whereof I affix my signature in presence of two witnesses.

OTTO W. HENSEL.

Witnesses:
 J. O. BONDHUS,
 WALTER R. HENSEL.